Aug. 25, 1970　　　　P. R. L. B. DORAND　　　　3,525,576
JET FLAP CONTROL

Filed March 10, 1969　　　　　　　　　　3 Sheets-Sheet 2

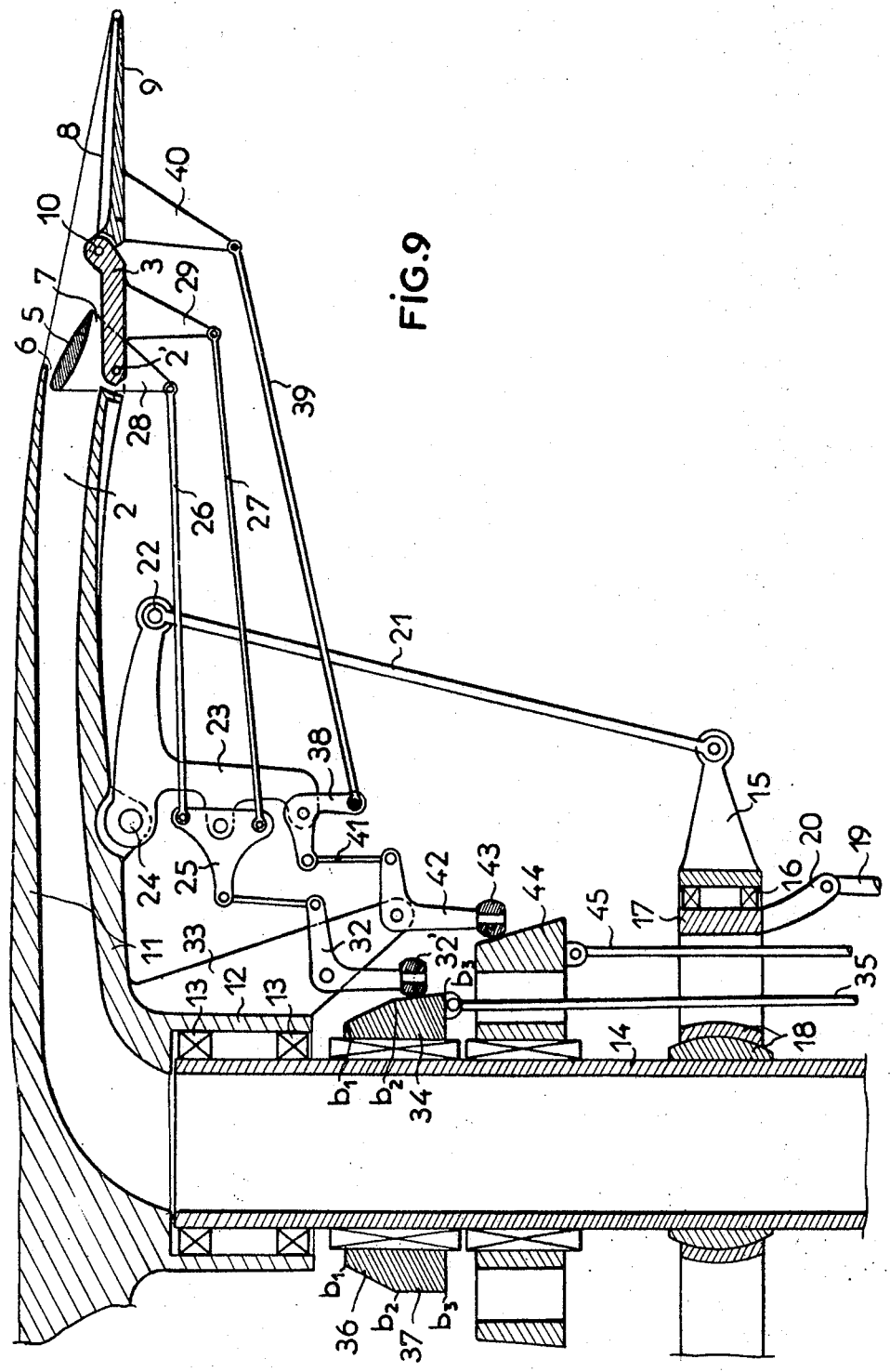

3,525,576
JET FLAP CONTROL
Pierre Rene Leon Bernard Dorand, 3 Rue de General
Lambert, Paris 7 eme, France
Continuation-in-part of application Ser. No. 647,509,
June 20, 1967. This application Mar. 10, 1969, Ser.
No. 805,755
Int. Cl. B64c 15/08, 27/18
U.S. Cl. 416—20
4 Claims

ABSTRACT OF THE DISCLOSURE

The invention relates to a helicopter rotor with fixed pitch blades each blade being fitted on its trailing edge with a "variable flap" jet slit comprising a jet reflector hingedly mounted on its lower lip and a profiled flap disposed in the neck of the jet slit and hinged upon the same axis as the deflector flap, with means of pivoting the deflector flap and profiled flap so as to vary the direction and outlet section of the jet slit and means of controlling the movement of these flaps for piloting the helicopter and means of cyclic control of these flaps in relation to the angular position of the blades and the flight conditions.

---

The present patent application is a continuation-in-part of the patent application Ser. No. 647,509 filed on June 20, 1967 and relating to a jet slit provided on the trailing edge of a helicopter rotor blade of the kind in which a gaseous jet under pressure emitted by this jet slit enables the lift of the wing or blade to be controlled by adjusting its direction, by effect of "variable flap" or, when the jet flows out of the jet slit without deflection, in the plane of no lift, produces a suction effect which tends to make the airflow cling to the aerofoil section surface, thereby contributing to reduce the drag of the profile.

The present invention concerns more particularly a rotor with fixed pitch blades, in which the jet slit of each blade comprises on its trailing edge a deflector flap hingedly mounted on the lower lip of the jet slit in combination with a profiled flap disposed in the beak of the jet slit and hinged upon the same axis as the jet deflector flap, this profiled flap being possibly displaced independently of the jet deflector flap or jointly with same to modify the cross-sectional area of the outlet neck of the jet slit, said neck being thereby divided in two adjustable passages with means of piloting the rotor by maneuvering the said flaps and means of controlling cyclically, by the flaps, the direction and/or the outlet section of the jet slit.

The control of the outlet configuration of a jet slit in this manner presents numerous advantages. On the one hand, as described in the original application, the aperture configuration may be adjusted according to the temperature of the jet efflux, for example, when the fluid is heated in order to increase the effective cross-sectional area of the jet aperture. On the other hand, and especially in the case of fast helicopter flight, the forward speed may be increased by cyclic control of the jet aperture, enabling the jet efflux to be increased along the trailing edge of the advancing blade and reduced along the trailing edge of the retreating blade, thus providing an additional thrust. Also, in the event of a breakdown in the supply of fluid under pressure to the jet slit, the control device may enable the jet slip aperture to be reduced so as to adjust it to the air supply provided by the action of centrifugal force on the air contained in the blades, taking advantage of boundary layer control to increase the effectiveness of the deflector flap. In the same way, when functioning normally, simultaneous movement of both the aerofoil section flap and the deflector flap tends to give the jet the desired direction and has an effect analogous to a form of swivelling jet slit.

The cyclical control of the orientation of the jet slit provides a very appreciable increase in propulsive efficiency by coinciding the jet speed-vector with the direction vector representing the absolute speed of the blade.

By way of example, the following description and attached drawings represent one form of cyclically controlled jet slit according to the invention.

FIG. 9 represents the rotor blade jet slit control system in vertical section.

Figure 2:
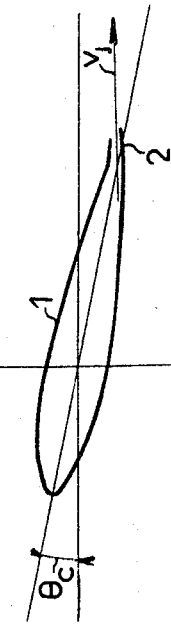
FIGS. 1 to 4 illustrate the principle of the invention.
Figure 1:
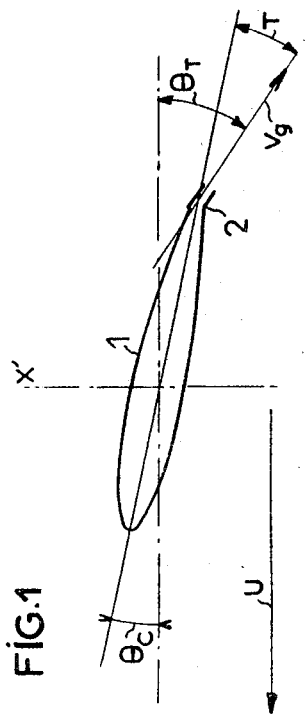

FIGS. 1 and 2 illustrate the principle of the invention in the case of hovering flight of a helicopter equipped with rotor blade such as 1 with their trailing edges fitted with a swivelling jet slit 2 rotating about axis X'X of the rotor which has a fixed angle of attack $\theta_c$, the said axis being vertical in the case of hovering flight. The speed of the helicopter is nil and the speed of rotation of the blade is represented by vector UT directed in relation to the cord of the blade. If the swivelling jet 2, emitting a jet of gas which procures the rotation and lift of the rotor, is directed downward as represented in FIG. 1, with a jet speed of Vj at an angle $\theta$T in relation to the perpendicular of the axis X'X and at an angle T in relation to the speed of rotation UT, the mechanical power imparted to the rotor by the jet may be determined by:

$$FSHP\theta T = MU_T(V_j \cos \theta_T - U_T)$$

where M is the gas output weight.

On the other hand, if as in FIG. 2, jet slit 2 is orientated in such a way as to be perpendicular to axis X'X, the mechanical power imparted to the rotor becomes:

$$FHSP_o = MU_T(V_j - U_T)$$

For example, if the angle of attack of the blade is $\theta = 12°$ and the angle T=15°, $\theta_T = \theta_c + T = 27°$. For a speed $U_T = 200$ m./s. and $V_j = 400$ m./s.

$$\cos \theta_T = \cos 27° = 0891$$

so that, by directing jet slit 2 according to FIG. 2, i.e. reducing angle $\theta_c$ to nil, an increase in power of about 30% is obtained.

Figure 4:
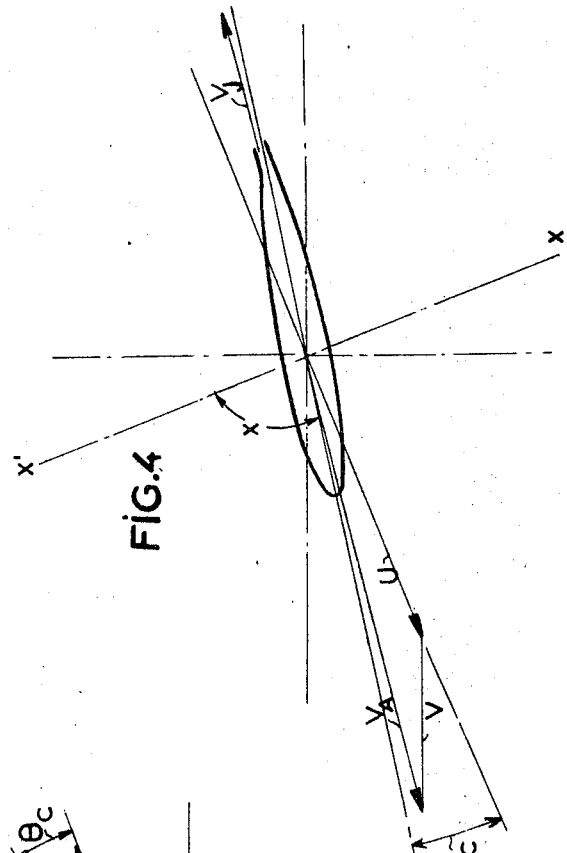
Figure 3:
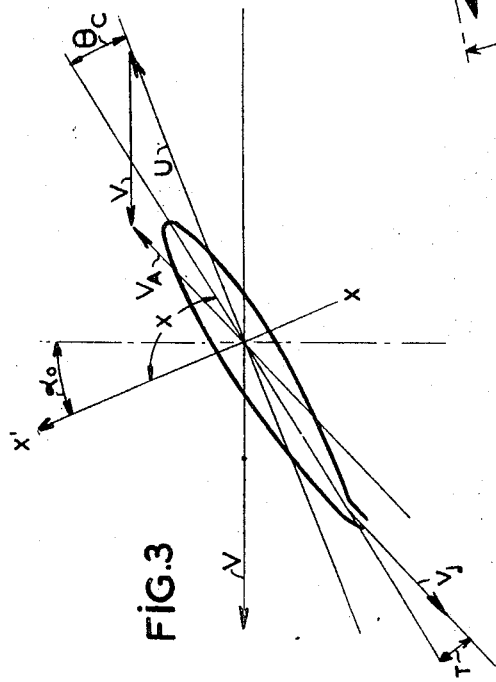
Figure 5:
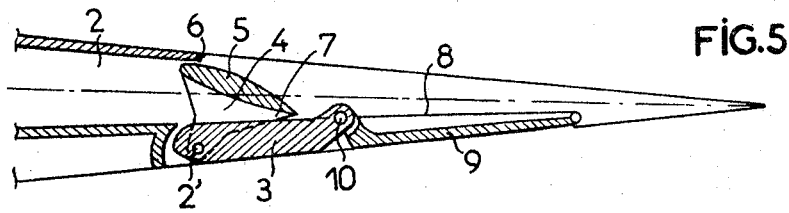
FIGS. 5 and 6 represent the adjustable jet slit according to application 647,509, in vertical section with the aerofoil control flap in two different positions, the deflector flap being maintained in its neutral position.
Figure 6:
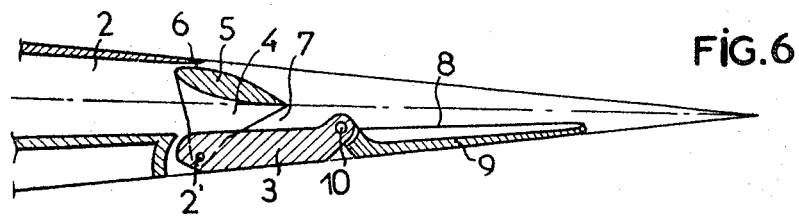
Figure 7:
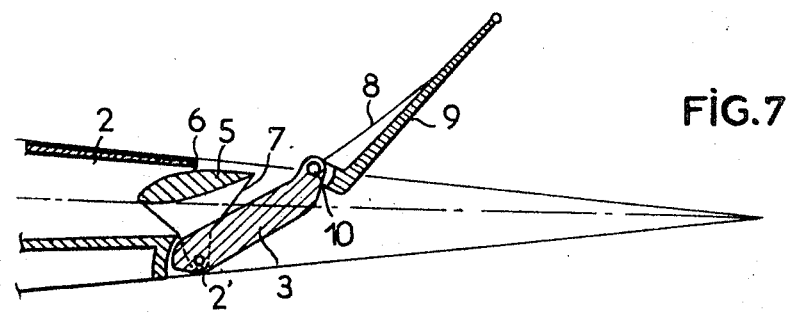
FIGS. 7 and 8 represent the jet slit in two positions in which the deflector flap and control flap assembly is moved upward and downward.
Figure 8:
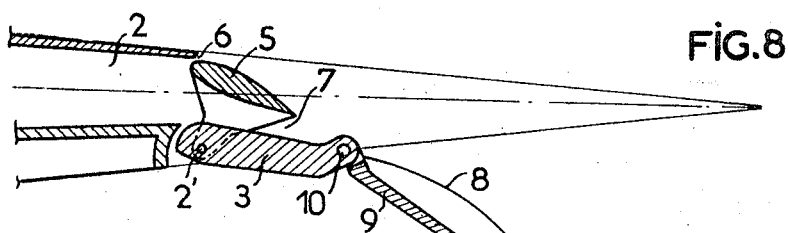

In the case of moving flight, represented in FIGS. 3 and 4, in which FIG. 3 represents the position of the retreating blade and FIG. 4 the advancing blade, the absolute speed $V_A$ of the blade results from the composition of the horizontal speed V of the helicopter and the speed of rotation U of the blade situated in a perpendicular plane to axis X'X of the rotor inclined at an angle $\alpha_o$. It may be seen that this speed $V_A$ is at an angle T in relation to the cord of the blade 1 and that jet slit 2 must be directed downward in order to make speed $V_j$ of the jet coincide with speed $V_A$ of the blade. In the case of the advancing blade (FIG. 4), angle T is slight, but in the opposite direction, and jet slit 2 must be directed upward slightly in order to make speed $V_j$ of the jet coincide with the direction of the absolute speed $V_A$.

Consequently, one object of the invention is to provide cyclic or multi-cyclic control of the jet deflector in order to coincide the speed of the jet with the absolute speed of the blade in the case of moving flight.

Another object of the invention is to provide a means of directing the jet slits in the blades in such a way that the jet speed will be horizontal in hovering flight.

Yet another object of the invention is to provide cyclical control of the jet slit aperture in such a way that it will be at maximum for the receding blade and minimum for the advancing blade.

Lastly, another object of the invention is to provide a means of controlling the aperture and deflection of the jet in such a way that they will adapt to all possible conditions of flight, in particular, in the case of partial or complete failure of the gas pressure generating unit, when the jet of air emitted through the jet slit by centrifugal force is so controlled as to procure autorotational flight.

Before describing the jet deflector control system according to the invention, we shall recapitulate the constitution of this jet deflector as described in the original patent application No. 647,509.

As represented in FIGS. 5 to 8, a jet slit 2 is formed in the trailing edge of the rotor blade and is supplied with fluid under pressure. A deflector flap 3 is hinged on the axis at 2′, adjacent to the lower edge of the lower edge of the jet slit. It is controlled by an appropriate irreversible mechanism which is described below. Supporting lugs 4 of aerofoil section secondary flap 5 are pivoted about the same axis 2, so that the secondary flap 5 is capable of rocking about this axis in the throat of the jet slit which it divides into two outlets 6 and 7, the flap 5 being so situated that its upper convex surface moves in close proximity to the upper edge of the jet slit 1, so that the upper outlet 6 always remains much narrower than the lower section 7: the main object of the narrow slit 6 is to improve the airflow over the upper surface of the wing or rotor blade and over the upper surface of this secondary flap 5, whilst the larger slit 7 produces the main aerodynamic effect, acting as a "jet flap." In FIG. 1, the secondary flap 5 is shown tipped backward with its leading edge close to the upper edge of jet slit 1, whilst its trailing edge is close to the deflector flap 3, this latter being in its neutral position, the total aperture area of the jet slit being thus considerably reduced, whilst, in FIG. 2, the secondary flap 5 is tipped forward in such a manner that the aperture, constituted principally by the lower section 7, is considerably increased.

In FIGS. 3 and 4, the whole assembly is shown in two positions in which the jet slit aperture remains constant, the jet being deflected upward in FIG. 3 and downward in FIG. 4 by simultaneously rotating deflector flap 3 and secondary flap 5 about axis 2.

The deflector flap is preferably constituted by a variable profile flap assembly comprising a flexible metallic strip 8, of which the leading edge is attached to flap 3 and its trailing edge is attached to the trailing edge of a second flap part 9 freely hinged at its leading edge 10 to the trailing edge of deflector flap 3. The adjunction of such a variable profile flap to the rigid deflector flap 3 improves its "jet flap" effect.

FIG. 9 represents, in vertical section, the cyclic control system of the swivelling and adjustable jet slit described above and represented in FIGS. 5 to 8. To simplify the drawing, only one blade 11 is represented comprising on its trailing edge a jet slit 2 fitted with a variable profile flap 3–9–8 and a secondary flap 5, this blade being fixed to a hub 12 mounted with a bearing 13 on a tubular shaft 14 through which the blades are supplied with gas under pressure.

The cyclic plate 15 is mounted with a bearing 16 on a ring 17 which slides on shaft 14 in relation to which it may be inclined by means of ball joint 18, the axial movements of the plate 15 being controlled by a lever 19 which is hinged on the one hand to an arm 20 fixed to ring 17 and is connected on the other hand to the control column, not shown, by conventional means.

For each of the blades 11, the cyclic plate 15 comprises a rod 21 hinged at one end to the rim of the said plate and at the other end to a bell crank 23 hinged at 24 to the underside of blade 11. Hinged to this bell crank 23 is a lever 25 in the shape of a T, the extremities of which are connected respectively by articulated rods 26 and 27 to supports 28 and 29 of the aerofoil section flap 5 situated in the neck of jet sluit 2 of the blade and of the deflector flap 3.

The T-shaped lever 25 is also connected by a short rod 30 to a bell crank 31 pivoted on a support 32 fixed to the hub 12 and fitted with a roller 32′ associated with a cam 34 mounted in such a way as it can slide on tubular shaft 14, its movement on this shaft being controlled by linkage 35.

Figure 10:
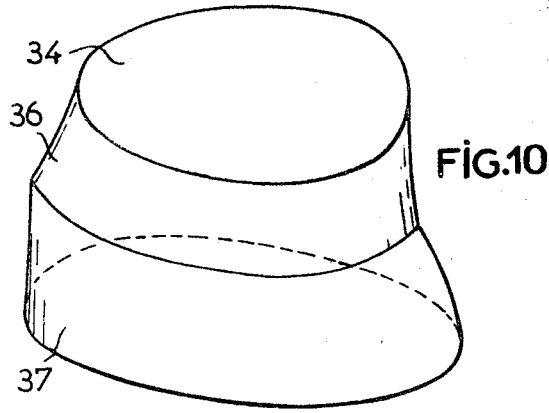
FIG. 10 represents in perspective, the cam which controls the opening of the jet slit.

The form of cam 34 may be seen more clearly in FIG. 10, its upper part is in the shape of a truncated cone 36 which is symmetrical in relation to shaft 13, so that when roller 32′ is in contact with this part of the cam, the positions of flaps 3 and 5 remain unaffected by cyclic variations except for those imparted by the cyclic plate 15, the movement of roller 32′ along a generating line $b_1$ to $b_2$ increases the section of passage 7 of the jet slit, between flaps 3 and 5, from a minimum $b_1$ corresponding to autorotational flight and a maximum $b_2$ corresponding to hovering flight.

On the other hand, the lower part 37 of cam 34 is asymmetrical (partly cylindrical and partly in the shape of a truncated cone with a wider angle than 36) so that when the roller is in contact with this part of the cam, the jet slit aperture is varied cyclically in such a way as to procure maximum aperture of the jet slit on the retreating blade and minimum aperture on the advancing blade.

Figure 11:
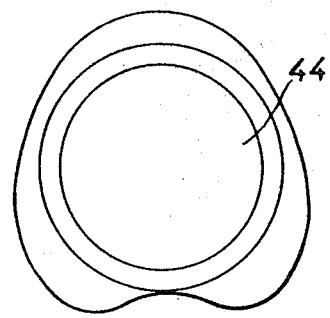
FIG. 11 is a plan view of the multi-cyclic jet deflection control cam.

A bell crank 38 is pivoted on the end of bell crank 23 and is connected by a rod 39 to support 40 of the second mobile flap 9 of the jet deflector, whilst the other arm of the bell crank 38 is connected by a short rod 41 to a bell crank 42 pivoted on support 33 and fitted with a roller 43 associated with a multi-cyclic cam 44 mounted in such a way as to slide on shaft 14, its movement being controlled by linkage 45. The form of the multi-cyclic cam is represented in plan view in FIG. 11.

The assembly operates as follows:

In the first place, lever 19 controls the vertical movement of cyclic plate 15 which sets the general angle of the deflector flaps corresponding to the general pitch of the blades of a conventional helicopter.

When the cyclic plate is moved upward, the swivelling jet slits are raised and, when horizontal, give maximum efficiency in hovering flight.

When the cyclic plate is raised further, the jet slits are deflected upward; this being necessary for autorotation and corresponds to negative blade pitch in a conventional helicopter.

On the other hand, by moving the control column, the cyclic plate may be inclined longitudinally or laterally and through connecting rods 21 and supports 23 and rods 26, 27 and 39, cyclic variation of the angle of the deflector flaps is obtained.

In particular, when the control column is moved forward, all the flaps constituted by parts 3, 5 and 9 are deflected; maximum deflection being applied to the retreating blade (FIG. 3) and minimum deflection to the advancing blade (FIG. 4).

Control of the jet slit aperture (passage section 7 between flaps 3 and 5) is obtained as described above by operating cam 34 through linkage 35. When roller 32′ runs on circle $b_1$, the passage section 7 is at its minimum (autorotation). When cam 34 is raised until roller 32′ runs on circle $b_2$, the passage section is increased (hovering flight), and if cam 34 is further raised so that roller 32′ runs on part 37 of the cam between circles $b_2$ and $b_3$, cyclic variation of the passage section is obtained procuring maximum aperture on the retreating blade and minimum aperture on the advancing blade; desirable in the case of a helicopter with mechanical transmission and a separate blower system, when reduction of air output is sought.

Finally, when cam 44 is moved upward by linkage 45, its associated roller 43 provides multi-cyclic control of the rear flap 9 of the jet deflector, the setting of this flap being dependent upon the flying speed of the helicopter.

I claim:
1. A helicopter rotor with fixed pitch blades, each blade being provided on its trailing edge with a jet slit with means for discharging a gaseous jet therethrough and with jet deflecting means comprising a deflector flap having a first main rigid part hinged on an axis parallel to and adjacent to an edge of the jet slit, a second rigid part hingedly connected to the first rigid part on a second axis parallel to the jet slit adjacent to a rear edge of said main part, a flexible surface element exposed to the gaseous jet discharged from said jet slit and attached to the main part of said deflector flap and to the trailing edge of the second rigid part and a profiled rigid flap situated in the neck of the jet slit and hinged upon the same axis as the said first main rigid part, a cyclic plate capable of vertical movement in relation to the axis of the rotor and of tilting in relation to the said axis, means for interconnecting this cyclic plate with said main rigid part, the second rigid part and the profiled flap arranged in the neck of the jet slit to simultaneously control the angular positions of said both rigid parts of the jet deflecting means and of the profiled flap to obtain general deflection of the jets by the vertical movement of the cyclic plate and cyclic variation of said deflection by tilting said plate respectively, cam means and cam follower means coaxially arranged on the rotor axis and connecting means between said cam follower means and the said first main rigid part and the said profiled flap to control the angular position of both said parts only to vary the slit aperture defined by both said members, and second cam means coaxially arranged on the rotor axis and having cam follower means connected to said second rigid hinged part of the jet flap to control the angular position of said second hinged rigid part only, the said cam means being slidably arranged on the rotor axis and having a frusto-conical shape dissymmetrical with respect to the axis thereof and being provided with individual means for vertically displacing said cam means along the axis of the rotor to obtain cyclic variations of said slit aperture and multicyclic variation of the inclination of said second rigid hinged part respectively.

2. A helicopter rotor according to claim 1 wherein the said first cam means have an upper part having a frusto-conical form which is symmetrical with respect to the rotor axis to adjust the aperture of the jet slit and a lower part of partly cylindrical and partly frusto-conical shape to cyclically vary said aperture, whereby said aperture is made maximum on the retreating blade and minimum on the advancing blade.

3. A helicopter blade according to claim 1 whereon the second cam means has a generally frusto-conical shape and a transverse section having the general form of a cardioid.

4. A helicopter blade according to claim 1 comprising a rod hingedly connected to the rim of the cyclic plate, a bell crank hinged to the under side of the blade and one end of which is connected to said rod, a T-shaped lever pivoted on said bell crank and two rods connecting the corresponding two ends of said T-shaped lever to the profiled flap to the first rigid part of the jet flap respectively, a support rigidly connected to the under side of the blade, a second bell crank pivoted on said support and carrying the follower of the first cam means, and a connecting link between said bell crank and the third end of the T-shaped lever, a third bell crank connected on the other end of the first, a fourth bell crank pivoted on said support and carrying on its one end the follower of the second cam means, a connecting rod hinged on the second end of said third bell crank and on the second rigid hinged part of the jet flap.

References Cited

UNITED STATES PATENTS

| 2,493,041 | 1/1950 | Stalker | 170—135.4 |
| 2,457,936 | 1/1949 | Stalker | 170—135.4 |
| 2,556,710 | 6/1951 | Stalker | 170—135.4 |
| 2,617,487 | 11/1952 | Stalker | 170—135.4 |
| 3,016,213 | 1/1962 | Griswold. | |

FOREIGN PATENTS 941,626  7/1948  France.

EVERETTE A. POWELL, JR., Primary Examiner

U.S. Cl. X.R.

416—23